United States Patent

Vrabec et al.

[11] Patent Number: 5,933,655
[45] Date of Patent: Aug. 3, 1999

[54] SYSTEM FOR SCHEDULING PERIODIC EVENTS HAVING VARYING RATES BY CASCADING A PLURALITY OF OVERLAPPING LINKED LIST DATA STRUCTURE

[75] Inventors: Tina L. Vrabec, Willoughby Hills; Peter J. Boldt, W. Farmington; Amy J. Wallaert, Concord; Scot A. Tutkovics, Sagamore Hills, all of Ohio

[73] Assignee: Allen-Bradley Company, LLC, Milwaukee, Wis.

[21] Appl. No.: 08/724,100

[22] Filed: Sep. 30, 1996

[51] Int. Cl.⁶ .................................................. G06F 13/374
[52] U.S. Cl. ........................ 395/880; 395/878; 395/860; 395/892; 364/260
[58] Field of Search ........................ 364/260; 395/878, 395/880, 860, 892

[56] References Cited

U.S. PATENT DOCUMENTS

| | | | |
|---|---|---|---|
| 3,633,181 | 1/1972 | Sikorsky | 379/131 |
| 4,787,061 | 11/1988 | Nei et al. | 395/500 |
| 5,627,745 | 5/1997 | Flood | 364/131 |
| 5,737,626 | 4/1998 | Hall et al. | 395/800.01 |

FOREIGN PATENT DOCUMENTS 246664   10/1989   Japan .

*Primary Examiner*—Thomas C. Lee
*Assistant Examiner*—Harold J. Kim
*Attorney, Agent, or Firm*—Michael E. Hudzinski; John M. Miller; John J. Horn

[57] ABSTRACT

A system for scheduling periodic events having varying rates. The system uses a linked list type data structure and an array to schedule the plurality of events having varying rates. In a preferred embodiment of the invention, data items are scheduled for transfer during a plurality of data transfer intervals. The linked list type data structure is traversed for each data transfer interval to collect the data items requiring transfer.

25 Claims, 7 Drawing Sheets

| PIT NO. 0 | PIT NO. 1 | PIT NO. 2 | PIT NO. 3 | PIT NO. 4 | PIT NO. 5 |
|---|---|---|---|---|---|
| 1.0 | 1.0 | 1.0 | 1.0 | 1.0 | 1.0 |
| 2.0 | 2.1 | 2.0 | 2.1 | 2.0 | 2.1 |
| 4.0 | 4.1 | 4.2 | 4.3 | 4.0 | 4.1 |
| 8.0 | 8.1 | 8.2 | 8.3 | 8.4 | 8.5 |
| 16.0 | 16.1 | 16.2 | 16.3 | 16.4 | 16.5 |

*Fig. 1*

| PIT NO. 0 | PIT NO. 1 | PIT NO. 2 | PIT NO. 3 | PIT NO. 4 | PIT NO. 5 | PIT NO. 6 | PIT NO. 7 |
|---|---|---|---|---|---|---|---|
| 1.0 | 1.0 | 1.0 | 1.0 | 1.0 | 1.0 | 1.0 | |
| 2.0 | DEL | 2.0 | DEL | 2.0 | DEL | | |
| 2.0 | DEL | 2.0 | DEL | 2.0 | DEL | | |
| 4.0 | 4.1 | 4.2 | 4.3 | 4.0 | | | |
| 8.0 | 8.1 | DEL | DEL | | | | |
| 8.0 | 16.1 | 16.2 | | | | | |
| 16.0 | 16.1 | | | | | | |
| 16.0 | | | | | | | |

*Fig. 2*
(PRIOR ART)

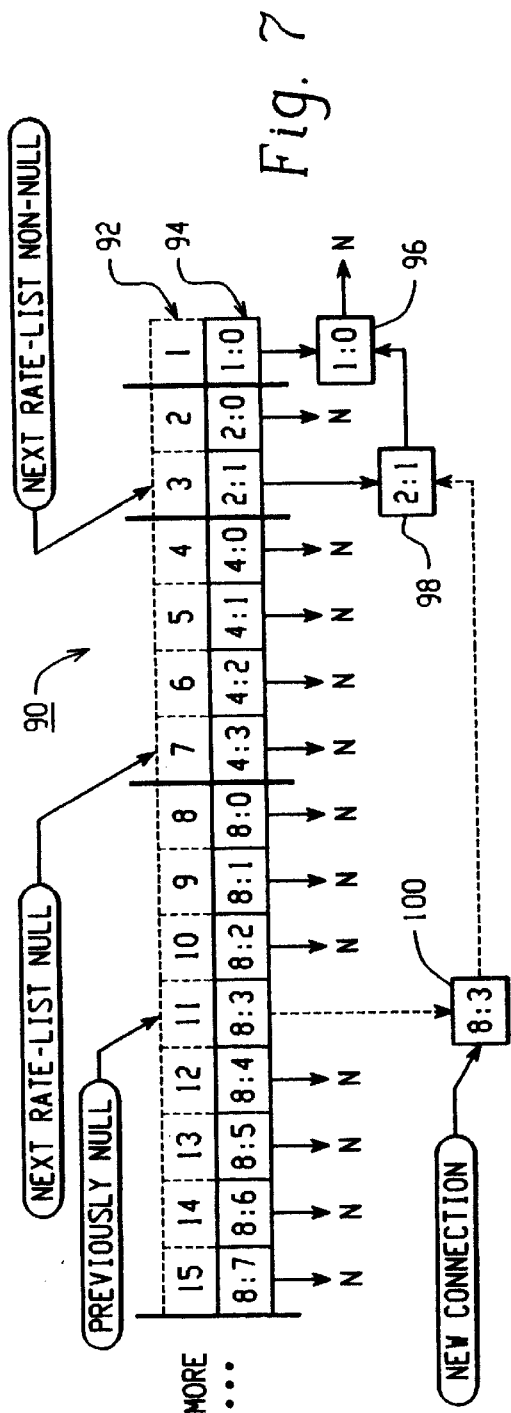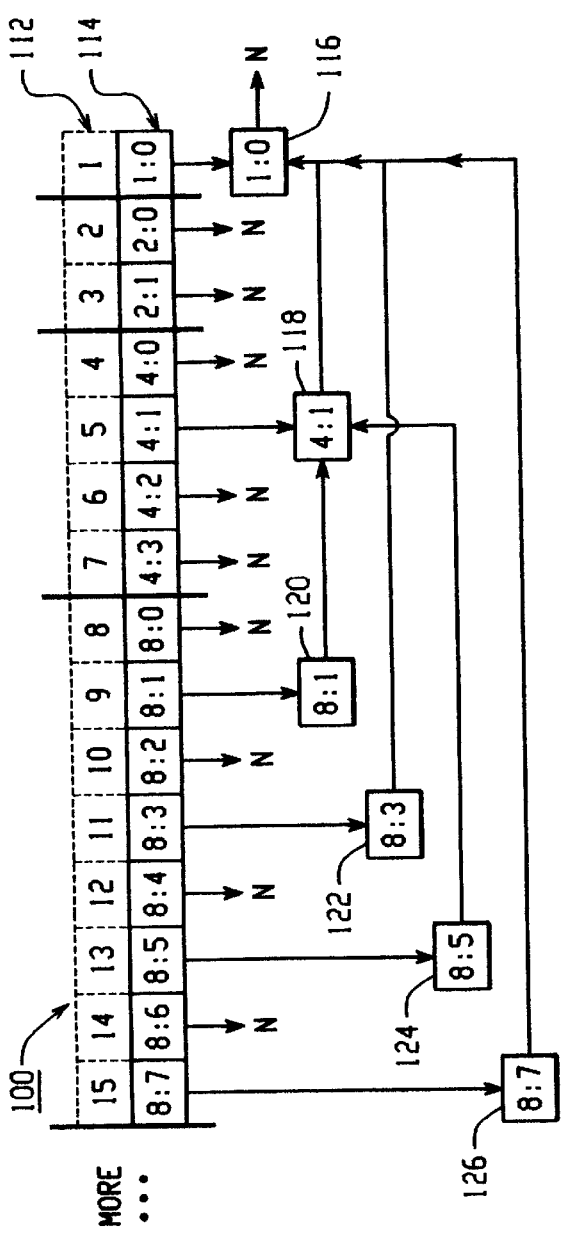

5,933,655

SYSTEM FOR SCHEDULING PERIODIC EVENTS HAVING VARYING RATES BY CASCADING A PLURALITY OF OVERLAPPING LINKED LIST DATA STRUCTURE

FIELD OF THE INVENTION

The present invention relates generally to a system for scheduling periodic events. More particularly, the present invention relates to a system for scheduling periodic events having varying rates. The system allows an increased number of events to be scheduled, and efficiently utilizes available memory space.

BACKGROUND OF THE INVENTION

In many computing environments there is a need to schedule periodic events having varying rates. For instance, the periodic event may be data collection for the purpose of data transfer or histogramming, or data sampling. Fast and efficient scheduling is particularly important where the data provides information about an ongoing automated industrial process for the purpose of controlling that industrial process. In this respect, the data may provide information relating to temperature, pressure, flow rate, torque, or electrical current, and based upon this information the condition of switches or valves may be changed. In many cases, the data may require updating at a very high rate (e.g., every 2 to 100 milliseconds) in order to provide timely information regarding the industrial process. A high-speed, high-performance network (e.g., ControlNet™ available from Allen-Bradley Company, Inc.) is often used to link together such devices as controllers, machine tools, workstations, I/O devices, man-machine interfaces (MMI) and other computing systems used for industrial automation. The network facilitates the transfer of data between devices. More specifically, the network provides fast, deterministic scheduled data transfers for control purposes and unscheduled non-time critical messages for configuration and housekeeping on the network.

On a typical network, a user-defined time interval is established for transmission of scheduled data. This time interval will be referred to as the Periodic Interval Time (PIT). This time interval is also known as the Network Update Time (NUT). The PIT is defined as the time interval between transmissions from each node (i.e., physical device) connected to the network. Accordingly, scheduled data is transmitted during each PIT.

It should be appreciated that the scheduled data provides a variety of different types of information regarding the industrial process, and as a result, there are often variations in how often a particular data item must be updated. Accordingly, some data items need to be transferred during each and every PIT, while other data items need only be transferred every other PIT. Still other data items need only be transferred every fourth PIT, or less frequently. The less often a data item is transferred, the slower the update rate.

The number of PITs occurring for an update of a particular data item is referred to as the pit-repeat-period or PRP. For the purpose of illustrating a preferred embodiment of the present invention, the PRP will be a power of two (e.g., 1, 2, 4, 6, 8, 16, 32, 64, or 128). However, it should be appreciated that other PRP values are also possible. A data item that is transferred every PIT will have a PRP of 1, while a data item that is transferred every fourth PIT will have a PRP of 4. The maximum PRP is known as a "macrocycle." Accordingly, the term "macrocycle" will refer to a set of PITs equal in number to the largest PRP. Data items having the maximum PRP will be updated at the slowest rate of any of the data items.

FIG. 1 shows a Table 10, which illustrates the scheduling of data items for transfer at each PIT. The data items are listed under the PIT number during which they are transferred. The data items are represented by a two-digit label where the first digit represents the PRP, indicating how often the data item is transferred. The larger the first digit, the less frequently the data item is transferred. The second digit represents the "first PIT" in a macrocycle during which the data item is transferred. Moreover, the second digit also represents the PIT number of the data item's respective PRP, during which the data item is transferred.

Data items labelled as 1.0 are transferred on every PIT of the macrocycle, and thus have a PRP of 1. Data items which need only be transferred every second PIT are labelled as 2.0 and 2.1. Likewise, data items which need only be transferred every fourth PIT are labelled as 4.0, 4.1, 4.2, and 4.3. All of the data items listed under the same PIT NO. are transferred during the same PIT. Therefore, the data items associated with labels 1.0, 2.0, 4.0, 8.0 and 16.0 are all required to be transferred during PIT NO. 0. Likewise, the data items associated with labels 1.0, 2.1, 4.1, 8.1 and 16.1 are all required to be transferred during PIT NO. 1, and so on. Moreover, data items labelled 1.0, 2.0, 4.0, 8.0, 16.0 are first transferred during PIT NO. 0, while data items labelled 2.1, 4.1, 8.1, 16.1 are first transferred during PIT NO. 1.

Prior art methods for scheduling data items for transfer required the use of a 2-dimensional array, such as the 2-dimensional array 20 shown in FIG. 2. It should be noted that only a portion of the 2-dimensional array is shown. The X-dimension of the array is established by the length of the macrocycle (i.e., the data items with the largest PRP.) Accordingly, if the largest PRP is 128, the X-dimension of the array must accommodate 128 PITs (i.e., PIT NO. 0 thru PIT NO. 127). The Y-dimension of the array will vary depending upon how many data items must be transferred during a respective PIT.

It should be appreciated that memory available for array 20 is often limited. Therefore, if array 20 is limited to, for example, a 6K byte block of memory, array 20 will have dimensions of 128 by 3, where there are 128 PITs, or dimensions of 16 by 24, where there are 16 PITs. By limiting the amount of available memory, the number of data items which can be transferred during a single PIT will also be limited, particularly when the macrocycle is very large (e.g., 128). Therefore, memory limitations impair the use of large macrocycles. Accordingly, there is a trade-off between the length of the macrocycle and the number of data items which can be transferred during each PIT.

The use of array 20 to schedule the data items to be transferred during each PIT has other drawbacks. In this respect, array 20 makes inefficient use of available memory. The same data item will take up multiple memory locations as it is repeatedly transferred during several different PITs. Accordingly, there are many entries in array 20 for the same data item. For example, the data item labelled 1.0 is duplicated for each and every PIT. Moreover, it is difficult to make use of memory locations in array 20 where the data item has been deleted. For example, data items have been deleted from PIT NOS. 1, 3 and 5, as indicated by the designation "DEL." While labels for data items can be moved to open memory locations where deletions have occurred, it requires that collection of data for a data transfer must be temporarily stopped. As a result, housekeeping functions for array 20 can slow data collection.

The present invention overcomes these and other drawbacks of prior art systems for scheduling periodic events having varying rates to provide a system which is faster, more efficient and reduces the amount of memory needed.

SUMMARY OF THE INVENTION

According to the present invention, there is provided a method for scheduling the transfer of data during a plurality of data transfer intervals on a computer network linking devices for an automated industrial process. The method includes the steps of generating a cascading list comprised of a plurality of linked data cells associated with data items, where each data item is being transferred during at least one of the data transfer intervals; and traversing the cascading list for a respective data transfer interval to collect the data items requiring transfer during the respective data transfer interval.

According to another aspect of the present invention, there is provided a method for scheduling the transfer of data during a plurality of data transfer intervals on a computer network linking devices for an automated industrial process. The method includes the step of generating a plurality of linked lists, where each linked list has at least one data cell. The data cell includes a first pointer to a data item and a second pointer to another data cell or a NULL pointer indicating the end of the linked list. Each of the plurality linked lists has data cells pointing to data items requiring transfer during the same data transfer interval. The method further includes the step of traversing one of the plurality of linked lists for each data transfer interval to collect the data items requiring transfer.

According to another aspect of the present invention, there is provided a method for scheduling periodic events occurring at various time intervals. The method includes the steps of generating a plurality of linked lists having linked data cells, where each data cell is associated with an event and each of the plurality of linked lists is associated with events occurring during the same time interval, and traversing one of the plurality of linked lists for each time interval to execute the event.

According to yet another aspect of the present invention, there is provided system for scheduling the transfer of data during a plurality of data transfer intervals on a computer network linking devices for an automated industrial process. The system includes means for generating a cascading list comprised of a plurality of linked data cells associated with data items. Each of the data items is transferred during at least one of the data transfer intervals. The system also includes means for traversing the cascading list for a respective data transfer interval to collect the data items requiring transfer during the respective data transfer interval.

According to yet another aspect of the present invention, there is provided a system for scheduling the transfer of data during a plurality of data transfer intervals on a computer network linking devices for an automated industrial process. The system includes means for generating a plurality of linked lists, each linked list having at least one data cell. The data cell includes a first pointer to a data item and a second pointer to another data cell or a NULL pointer indicating the end of the linked list. Each of the plurality linked lists has data cells pointing to data items requiring transfer during the same data transfer interval. The system also includes means for traversing one of the plurality of linked lists for each data transfer interval to collect the data items requiring transfer.

It is an object of the present invention to provide a system for scheduling periodic events having varying rates, wherein the scheduling of events is fast and efficient, and memory requirements are reduced.

It is another object of the present invention to provide a system for scheduling the transfer of data, wherein the data storage structure allows the maximum number of data items to be transferred during each data transfer interval regardless of macrocycle length.

It is another object of the present invention to provide a system for scheduling the transfer of data, wherein the data items transferred during each data transfer interval are linked to reduce data collection time.

It is an object of the present invention to provide a system for scheduling the transfer of data, wherein the amount of memory space required for scheduling the data is minimized.

It is still another object of the present invention to provide a system for scheduling the transfer of data, wherein linked lists are used to collect the data items being transferred.

It is still another object of the present invention to provide a system for scheduling the transfer of data, wherein data collection time is reduced.

These and other objects will become apparent from the following description of a preferred embodiment taken together with the accompanying drawings and the appended claims.

BRIEF DESCRIPTION OF THE DRAWINGS

The above-mentioned and other features and objects of the invention and the manner of attaining them will become more apparent and the invention itself will be best understood by reference to the following description of an embodiment of the invention taken in conjunction with the accompanying drawings, wherein:

FIG. 1 is a table illustrating the scheduling of data items for a data transfer;

FIG. 2 shows a data array used to schedule the transfer of data items according to the prior art;

FIGS. 7–10 illustrate an add routine for adding a connection to the cascading list of the present invention;

DETAILED DESCRIPTION OF THE PREFERRED EMBODIMENT

It should be appreciated that while a preferred embodiment of the present invention will be described with particular reference to the scheduling of data collection for a data transfer, the present invention has broader applications to the scheduling of other periodic events having varying rates, including the scheduling of data collection for histogramming and the scheduling of data sampling.

The present invention uses a linked list data structure to schedule the transfer of data. A "linked list" data structure is made up of one or more data cells, each data cell consisting of an element of the list and a pointer to the next data cell on the list. The use of pointers eliminates the use of contiguous memory (e.g., an array) for storing a list of data and hence from shifting elements to make room for new elements or to close up gaps created by deleted elements.

It should be understood that the term "pointer" as used herein refers to pointers which directly address a memory location by providing a memory address, and to pointers which indirectly address a memory location by providing an index value for an array, where the array contains the memory address.

According to a preferred embodiment of the present invention, the data cells associated with the data items to be transferred are referred to as "connections" and include first and second fields. The first field has a "data" pointer which points to a location in memory which stores the data item for transfer or stores a pointer to the data item for transfer. The second field has a pointer which points to the next connection for transfer during a given PIT or points to a NULL (i.e., "NULL pointer"), as will be explained below.

One linked list, known as a "PIT list," is generated for each PIT in the macrocycle. The PIT lists are overlapped (i.e., interlinked) to form a single "cascading" list which includes all of the connections for every PIT in the macrocycle.

The connections in a PIT list are arranged in descending order by PRP. Accordingly, the data item associated with the first connection in the list has a large PRP or slow update rate. Next on the list there may be several other connections associated with data items having the same PRP. Next, the list will point to a connection associated with a data item having a lower PRP, but one which is still transferred during the same PIT. The list continues in this manner for all of the connections associated with data items transferred during the respective PIT.

Figure 3:
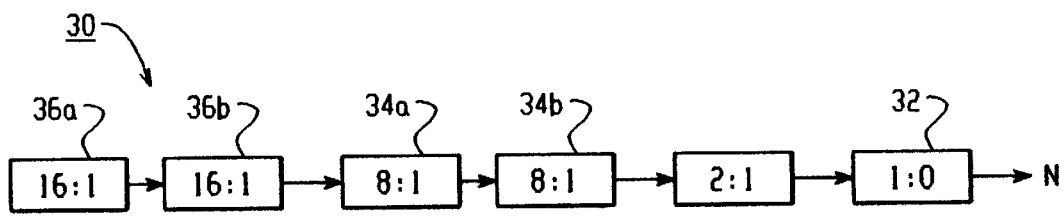
FIG. 3 shows an example of a linked list data structure used for carrying out the present invention.

Reference is now made to FIG. 3, where there is shown a PIT list 30 for a single PIT. For the purpose of illustrating a preferred embodiment of the present invention, each connection is shown as a box with an arrow. The box represents the first field of the data cell, which provides a pointer to the data item. The box is labelled with the attributes (i.e., PRP and first PIT) of the associated data item. In this respect, the first digit indicates the PRP for the data item associated with the connection (i.e., how often the data item associated with this connection is transferred) and the second digit provides the "first PIT" during which the data item associated with the connection is transferred. It should be noted that if there are no data items which are transferred at one of the PRPs (e.g., at PRP=4), PIT list 30 for this PIT will not include any connections with data items having that PRP. The arrow represents the second field of the data cell, which provides a pointer to the next connection or a NULL pointer, as in the case of connection 32 shown with an arrow pointing to an N. A NULL pointer is used to indicate the end of a PIT list. It should be noted that there may be multiple connections with the same label (e.g., connections 34a, 34b and connections 36a and 36b), indicating that there are multiple data items having the same attributes (i.e., same PRP and same first PIT). However, it should be understood that the data items associated with each of the connections differ.

Figure 4:
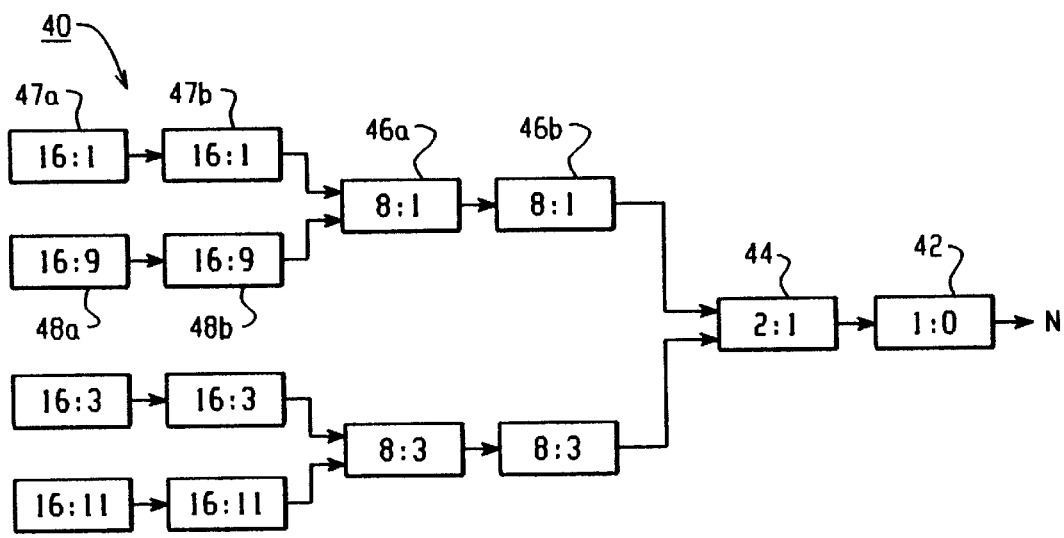
FIG. 4 shows an example of overlapping linked list data structures for carrying out the present invention.

As indicated above, a plurality of PIT lists are overlapped (i.e., interlinked) to form a cascading list, such as cascading list 40 shown in FIG. 4. The overlapping of PIT lists reduces the memory requirements. In this respect, a data item associated with a given connection may be transferred during several different PITs within a macrocycle, depending on the PRP. Therefore, a particular connection will be included in more than one PIT list. To avoid repeating connections, the PIT lists are overlapped to form one large cascading list. Referring now to cascading list 40, during a 1st PIT data items associated with connections 47a, 47b, 46a, 46b, 44 and 42 will be collected, while during a 2nd PIT data items associated with connections 48a, 48b, 46a, 46b, 44 and 42 will be collected. Cascading list 40 avoids the need to repeat connections 46a, 46b, 44 and 42 in separate PIT lists for the first and second PITs described above. It should be noted that connection 42 has a NULL pointer indicating the end of cascading list 40.

Figure 5:
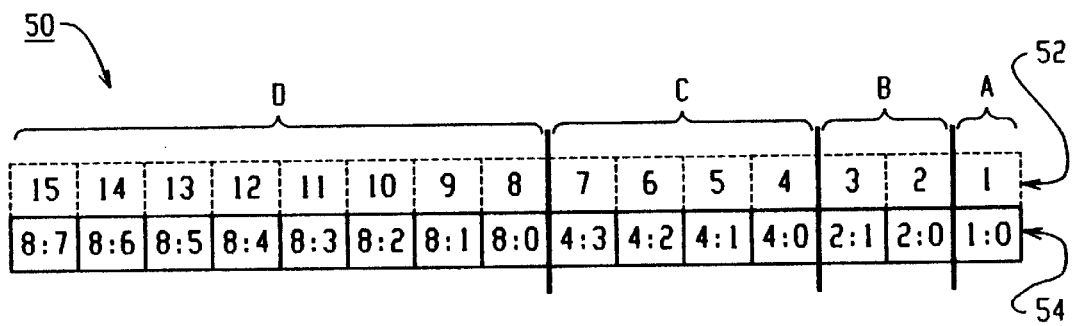
FIG. 5 shows an exemplary scheduling array for carrying out the present invention.

Referring now to FIG. 5, there is shown a schedule head array 50. Schedule head array 50 is used to simplify the procedures for adding and deleting connections from a cascading list. These procedures will be described in detail below. Schedule head array 50 is a one-dimensioned array data structure having a plurality of array data cells 54, which are referenced by index numbers 52. Each array data cell 54 stores a pointer to a connection in a cascading list or a NULL pointer, as will be seen in FIG. 6. These pointers will be referred to as schedule head pointers and are illustrated as arrows. For the purpose of illustrating a preferred embodiment of the present invention, array data cells 54 are labelled with two-digit numbers indicating attributes of data items. In this respect, the first digit represents a PRP and the second digit represents a first PIT.

Schedule head array 50 is divided into sections for each PRP. In the example shown in FIG. 5, schedule head array 50 is divided into four sections labelled A, B, C, and D. Each section has one array data cell 52 corresponding to each of the possible first PITs for that section's respective PRP. The PRP value for a section corresponds to the initial index number for the respective PRP section. The first PIT value is used as an offset within a given PRP section. Accordingly, index numbers 52 are established according to the formula: index number=PRP+first PIT. This relationship between index numbers 52, the PRP and the first PIT allows index numbers 52 to be used for determining a corresponding PRP and first PIT value.

It should be appreciated that the last section of schedule head array 50 is the section having array data cells 54 for a PRP equal to the number of PITs in the current macrocycle (i.e., "PITs per macrocycle"). This will facilitate entry into the cascading list for data collection, as will be explained in detail below.

Figure 6:
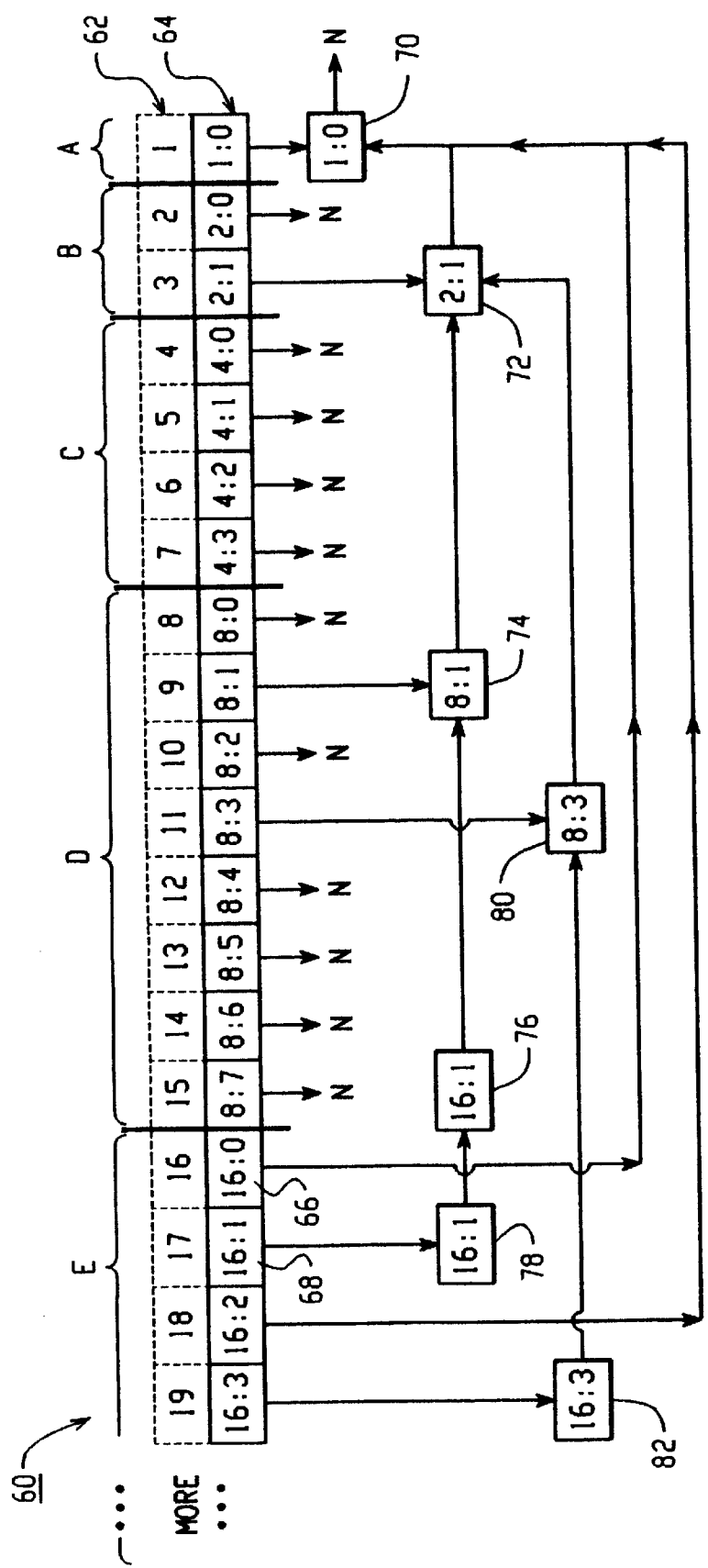
FIG. 6 illustrates an exemplary scheduling array with pointers to a cascading list.

Referring now to FIG. 6, there is shown a schedule head array 60 having array data cells 64 referenced by index numbers 62. Schedule head array 60 is divided into a plurality of sections A through E, where each section corresponds to a different PRP. FIG. 6 also illustrates pointers to connections in a cascading list and NULL pointers. The cascading list in combination with the schedule head array is referred to as a "cascading access linked list" or CALL Each schedule head pointer points to the beginning of a rate-list within the cascading list. Each rate-list consists of connection(s) having the same PRP and same first PIT. The last connection of one rate-list points to the next rate-list for the same PIT, which consists of connection(s) having the next smallest PRP.

Data collection will now be described with reference to FIG. 6. According to a preferred embodiment of the present invention the schedule head pointers of the section of the schedule head array corresponding to a PRP equal to the PITs per macrocycle will act as "entry pointers" to the "first" rate-list for each PIT. Therefore, the array data cells in the schedule head array corresponding to PRPs equal to the PITs per macrocycle will provide the initial pointer for traversing the cascading list for each PIT. Alternatively, this function could be handled by a separate table, wherein the table has a pointer for each PIT. The pointers point to the "first" rate-list for the respective PIT. It should be appreciated that this additional table requires the use of more memory.

In the case of schedule head array 60, section E has the schedule head pointers pointing to the "first" rate-list for each PIT, since these array data cells correspond to a PRP equal to the PITs per macrocycle (i.e., 16). For PIT NO. 0, array data cell 66 points to connection 70, which is the first and only rate-list for this PIT. In this respect, connection 70 has a NULL pointer indicating the end of the connections for this PIT. Moving on to PIT NO. 1, array data cell 68 points to the first rate-list in this PIT consisting of connections 78 and 76, both of which are associated with data items having a PRP of 16 and a first PIT of 1. Connection 78 is referred to as the "first instance," while connection 76 is referred to as the "second instance." Connection 76 then points to the next rate-list for the same PIT. This rate-list has the next smallest PRP, which is 8. The rate-list consists of only connection 74, which is associated with a data item having a PRP of 8 and a first PIT of 1. Connection 74 then points to the next rate-list for the same PIT. This rate-list has the next smallest PRP, which is 2, since there are no connections associated with data items having a PRP of 4. The rate-list consists of only connection 72. Connection 72, in turn, points to the next rate-list, which consists of only connection 70. As indicated above, connection 70 has a NULL pointer indicating the last connection for this PIT. Accordingly, the data items associated with connections 70, 72, 74, 76 and 78 will be collected for transfer during the same PIT. On the next PIT in the macrocycle (i.e., PIT NO. 2), only the data items associated with connection 70 will be collected. On PIT NO. 3 in the macrocycle, data items associated with connections 82, 80, 72 and 70 will be collected. Data collection proceeds in this manner until all of the data items for a complete macrocycle are collected. The foregoing data collection procedure will then repeat itself.

It should be understood that as the cascading list is traversed the data items associated with the connections may be immediately transferred, or alternatively, the data items or pointers to the data items may be saved in memory for later transfer (e.g., during a DMA cycle).

There are three important functions (i.e., ADD, DELETE and data collection) which are required to process and maintain a cascading list. Accordingly, an add connection routine (see FIGS. 7–10), a delete connection routine (see FIGS. 8, and 11–12), and a data collection routine for collection of the data items for transfer (see FIG. 12) are provided.

The add connection routine adds a connection to the cascading list, and will be described with reference to FIGS. 7–10. Before adding a connection, it must be determined if there is enough bandwidth to accommodate the new connection. Accordingly, a PIT info array is provided to provide information about the usage of each PIT, and more specifically, it contains the amount of data items being transferred during each PIT. The PIT info array is referenced for each PIT during which the data item associated with the new connection is transferred. Accordingly, it is determined whether sufficient bandwidth is available.

The add connection routine first determines the location in the cascading list for the new connection based on the PRP and the first PIT of the new connection. The new connection is then linked at the appropriate position in the cascading list, as described in detail below.

Reference is first made to FIG. 7 which shows a schedule head array 90 comprised of array data cells 94 referenced by index numbers 92. The PITs per macrocycle in this example is 16; accordingly, the array data cells corresponding to a PRP equal to the PITs per macrocycle are not shown. A new connection 100 is added to an existing cascading list comprised of connections 96 and 98. The add routine first determines the index number referencing the array data cell corresponding to the same PRP and same first PIT associated with the new connection. In this respect, the index number is determined by computing the sum of the PRP and the first PIT associated with the new connection. In the example shown in FIG. 7, index number 11 is determined by summing 8 and 3 for new connection 100.

Where the PRP associated with the new connection is equal to the PITs per macrocycle, then the schedule head pointer referenced by the computed index number will point to the new connection, and the new connection will point to the connection the schedule head pointer was previously pointing to. In this situation, the addition of the new connection is complete with no further checks of the schedule head array. However, it should be appreciated that in the present example the PRP associated with the new connection 100 is 8, while the PITs per macrocycle is 16. Therefore, the foregoing procedure is not followed.

Where, as in the present case, the PRP associated with the new connection is not equal to the PITs per macrocycle, it must first be determined whether the schedule head pointer corresponding to the computed index number is NULL or NON-NULL. If the schedule bead pointer referenced by the computed index number is NON-NULL, then the new connection will be placed as the "second instance" on this corresponding rate-list. Placing the new connection as the second instance on the rate-list eliminates the need to find all of the rate-lists that currently point to this rate-list. As a result, the add routine is substantially faster. If the schedule head pointer referenced by the computed index number is a NULL pointer (as in the present example), the schedule head pointer will point to the new connection, and then the next rate-list must be found. The next rate-list is determined by examining each schedule head pointer which points to connections associated with data items transferred on the same PIT as the new connection, but with PRPs smaller than the PRP of the new connection. When such a pointer is found with a NON-NULL pointer, the connection it is pointing to is determined to be the beginning connection of the next rate-list. The pointer of the new connection is set to point to this rate-list.

With particular reference to FIG. 7, the computed schedule head index number referencing the schedule head pointer for new connection 100 is 11, as discussed above. Since the PRP of 8 is not equal to the PITs per macrocycle of 16, and the corresponding schedule head pointer was previously a NULL the schedule head pointer referenced by index number 11 is modified to point to new connection 100. The next rate-list is then determined by examining each schedule head pointer which points to connections associated with data items transferred on the same PIT as new connection 100, but having PRPs smaller than the PRP of new connection 100. The first next rate-list schedule head pointer to be examined is referenced by index number 7. Since this schedule head pointer is a NULL pointer, the next rate-list (i.e., the rate-list with the next smallest PRP) must be examined. The next rate-list schedule head pointer to be examined is referenced by index number 3. This schedule bead pointer is NON-NULL since it points to connection 98. Accordingly, connection 98 is determined to be the beginning connection of the next rate-list. Therefore, new connection 100 points to connection 98.

The following pseudo-code describes in further detail how the next rate-list is determined:

```
set checked_sched_head_index to the index number being checked in the Sched_Head array
set checked_period to the pit_repeat_period for the new connection
set next_connection to the connection that Sched_Head is pointing to
loop while next_connection is set to NULL and checked_sched_head_index is not equal to
one
    set check_period equal to the next lowest pit_repeat_period by dividing by two
    set checked_sched_head_index to the Sched_Head index number for the rate-list for the
    same PIT as_the new connection but with the pit_repeat_period set to check_period.
    This is calculated by adding an offset to checked_period. The offset is determined by
    taking the remainder produced by dividing the old value of checked_sched_head index by
    the current value of check_period.
    set next_connection to the connection that Sched_Head is pointing to for an index
    number of checked_sched_head_index.
```

At the end of the loop, next_connection is equal to the start of the next rate-list. Once the next connection is determined, the next_sched value for the new connection is set equal to next_connection.

Once the appropriate schedule head pointer points to the new connection, and the new connection has its own pointer set to point to the appropriate next connection, the next step in the ADD connection routine is to find all of the rate-lists that need to point to the new connection. These rate-lists are found by examining the schedule head pointers which point to connections having data items transferred on the same PITs as the new connection, but having PRPs that are larger than the PRP associated with the new connection.

For a PRP double the current PRP, there can be up to two rate-lists which transfer data items during the same PITs as the new connection. The 1st rate-list is found by offsetting the first index number having the doubled PRP by the first PIT value of the new connection. The 2nd rate-list is found by offsetting the first index number having the doubled PRP by the sum of the first PIT and the current PRP.

The rate-lists of the first pair of schedule head pointers are checked. If a schedule head pointer is NON-NULL, then this rate-list can be identified as one of the rate-lists which needs to point to the new connection. However, if either of the 1st pair of schedule head pointers is NULL, then the value of the current PRP is again doubled, and for each NULL found, a 2nd pair of schedule head pointers in another section of the schedule head array are checked in the same manner as above. If both of the 1st pair of schedule head pointers are NULL, then there will be two pair of schedule head pointers to check in the next PRP in yet another section. In this respect, there are two new schedule head pointers to check for the first NULL pointer found and two new schedule head pointers for the second NULL pointer found. To determine these new schedule head pointers the doubling rule mentioned above will be used but the starting pointers will be the array data cells having the NULL pointers. In other words, for every NULL rate-list found there is one pair of rate-lists which need to be checked. When all of the rate-lists under examination are NON-NULL rate-lists or the rate-list under examination has a PRP equal to the PITS per macrocycle, no further examination of the rate-lists is necessary.

Figure 9:
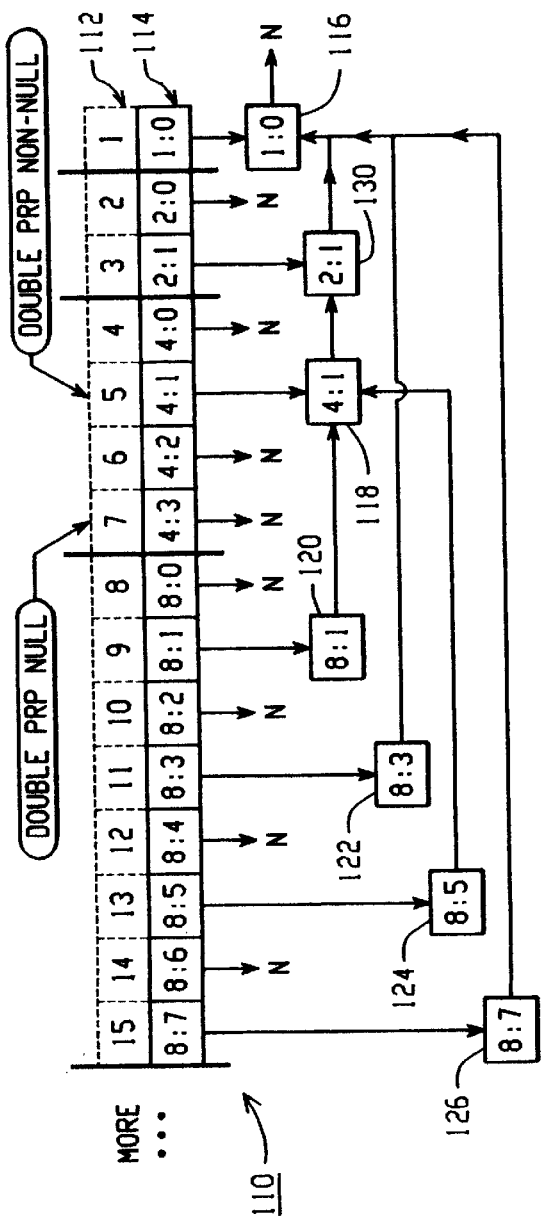
Figure 10:
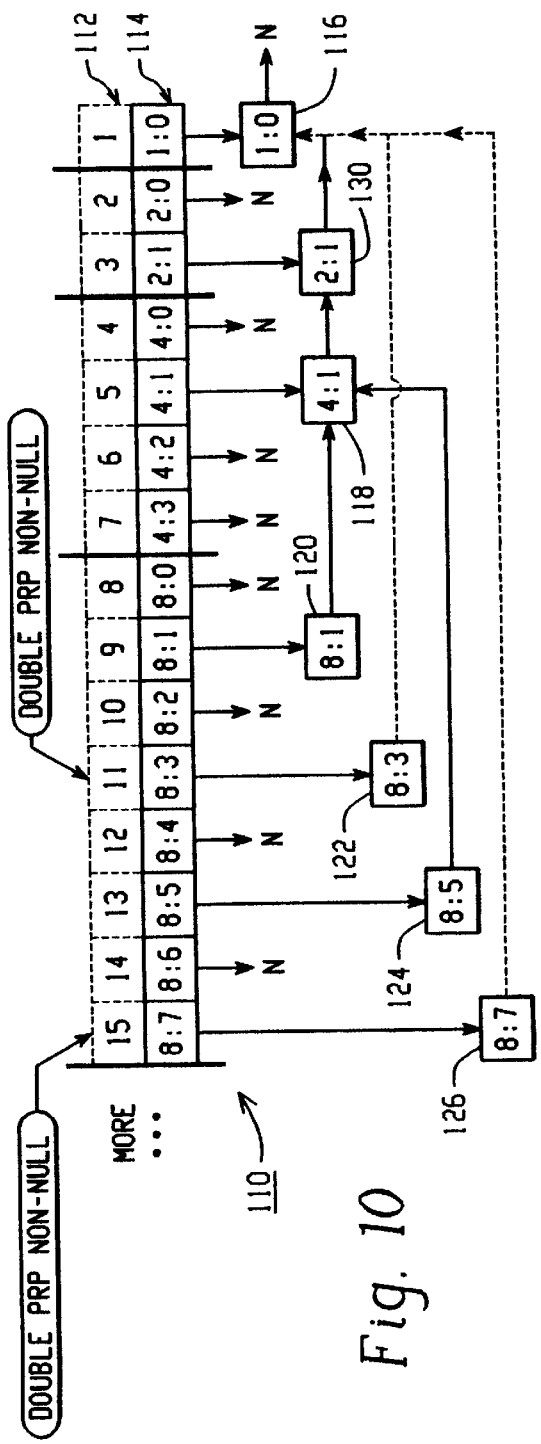

The foregoing procedure for finding the rate-lists that need to point to a newly added connection will now be explained with reference to FIGS. 8–10, where a new connection 130 is added to a cascading list including connections 116 through 126. FIG. 8 shows a schedule head array 110 and cascading list before new connection 130 is added. Schedule head array 110 is comprised of array data cells 114 referenced by index numbers 112. In this example, the PITs per macrocycle is 16.

First, the schedule head pointer pointing to new connection 130 is determined based upon the PRP and first PIT of new connection 130. Next, the pointer of new connection 130 is set to point to the next rate-list, using the procedure discussed above in connection with FIG. 7. Now it is determined which rate-lists need to point to new connection 130 (see FIG. 9). Since new connection 130 is associated with a data item having a PRP of 2, a pair of schedule head pointers corresponding to a "double" PRP of 4 are checked.

According to the procedure set forth above, the first of the two schedule head pointers will have a referencing index number equal to the PRP under examination (i.e., 4) plus the first PIT value of the new connection (i.e., 1). In the present case, the index number will be 5. The second of the two schedule head pointers will have a referencing index number equal to the PRP under examination (i.e., 4) plus the sum of the first PIT value of the new connection (i.e., 1) and the PRP of the new connection (i.e., 2). Thus, in the present case, this index number will be 7. Since the schedule head pointer referenced by index number 5 is NON-NULL, the pointer of connection 118 is changed to point to new connection 130. Since the schedule head pointer referenced by index number 7 is NULL, the PRP of 4 is doubled, and two more schedule head pointers corresponding to PRPs of 8 are checked (see FIG. 10).

The pair of schedule head pointers corresponding to PRPs of 8 are determined to have referencing index numbers of 11 and 15. These index numbers are determined in the same manner as discussed above for the PRPs of 4. In this respect, the first schedule head pointer will have a referencing index number equal to the PRP under examination (i.e., 8) plus the first PIT value corresponding to the schedule head array data cell having the NULL pointer (i.e., 3). Thus, in the present case, the index number will be 11. The second schedule head pointer will have a referencing index number equal to the PRP under examination (i.e., 8) plus the sum of the first PIT value corresponding to the schedule head array data cell having the NULL pointer (i.e., 3) and the corresponding PRP of the schedule head array data cell having a NULL pointer (i.e., 4). Thus, in the present case, the index number will be 15.

Since both of the schedule head pointers referenced by index numbers 11 and 15 are NON-NULL, no further examination of the rate-lists is necessary. Accordingly, connections 122 and 126 are both changed to point to new connection 130, rather than connection 116.

It should be appreciated that if the PRP under analysis reaches the PITs per macrocycle and the corresponding schedule head pointer is NULL, the schedule head pointer for this rate-list is pointed at the new connection. In this respect, in accordance with a preferred embodiment of the present invention, the data collection routine begins traversing the cascading list using the schedule head pointers in the section of the schedule head array corresponding to a PRP equal to the PITs per macrocycle. Accordingly, these schedule head pointers act as entry pointers to the rate-lists for each PIT. Therefore, all rate-lists must be connected to this section of the schedule head array.

A recursive routine named tran_client_find_connections is provided to find the existing connections in the cascading list which should point to the new connection. It should be appreciated that this routine is only called if the PRP is not equal to the PITs per macrocycle. Pseudo-code for the tran_client_find_connections routine is set forth below:

pointer will not be pointing directly to it. Accordingly, the cascading list must be traversed to find the connection to be deleted. Once the connection has been found, the connection can be deleted by taking the connection above it in the rate-list and pointing it at the connection below it in the cascading list. In the example shown in FIGS. 11–12, the connection to be deleted (i.e., connection 150) is the second instance on the rate-list. Therefore, when connection 150 is deleted from the cascading list, connection 152 is pointed at connection 148.

If the connection to be deleted is first in the rate-list (i.e., first instance), then all the connections which point to this rate-list must also be found. These connections are found in the same manner as they are found for the add connection routine described above. Once these connections are found, they are pointed at the next connection in the rate-list. In addition, the appropriate schedule head pointer is also pointed at the next connection in the rate-list.

The data collection routine will now be described in further detail with reference to FIG. 13, which shows a

```
void dl_client_find_connections (new_connection, pit_request_period, first_pit,
next_conn)
check the pointer at index (pit_request_period + first_pit) + pit_request_period
   if the pointer is NULL
      if the (pit_request_period * 2) is NOT equal to Pits_Per_Macrocycle
         call dl_client_find_connections (new_connection,
            2*pit_request_period),
            first_pit,
            next_connection)
      else
         set Sched_Head [(pit_request_period + first_pit) + pit_request_period]
            to the new connection
   if the pointer is NULL
      adjust this pointer
check the pointer at index (pit_request_period + first pit) + 2*pit_request_period
   if the pointer is NULL
      if the (pit_request_period * 2) is NOT equal to Pits_Per_Macrocycle
         call dl_client_find_connections (new_connection,
            (2*pit_request_period),
            (first_pit + pit_request_period),
            next_connection)
      else
         set Sched_Head [(pit_request_period + first_pit) + 2*pit_request_period]
            to the new connection
   if the pointer is NULL
      adjust this pointer
```

It should be appreciated that the add routine discussed above will add a connection to the appropriate position in the cascading list given (1) a pointer to a data item, (2) the data item's PRP, and (3) the data item's first PIT.

Figure 11:
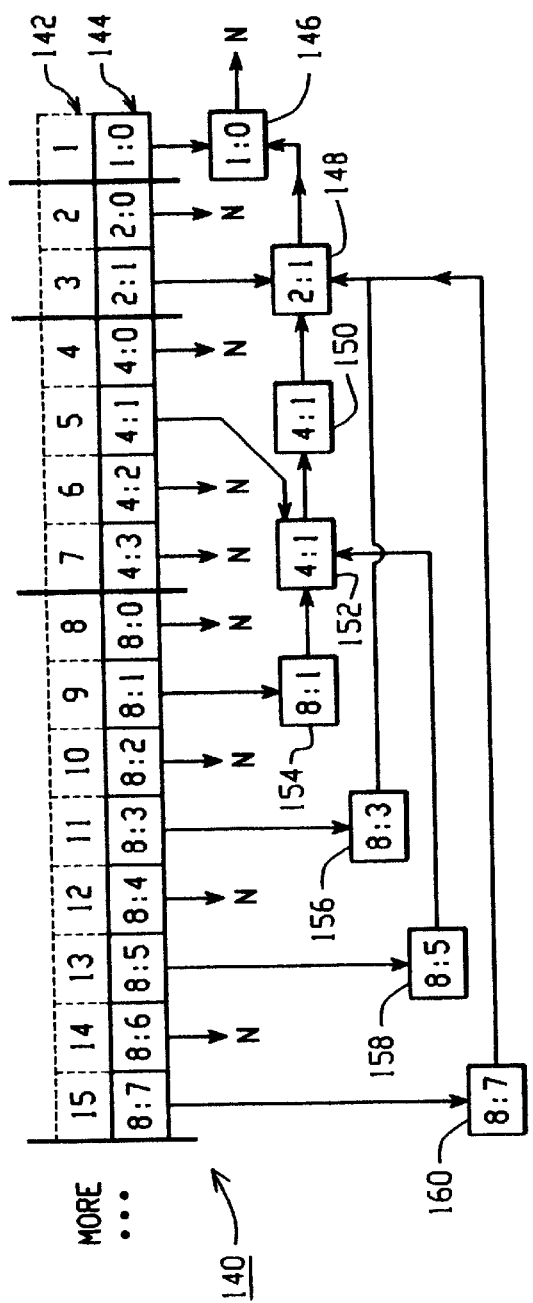
FIGS. 11–12 illustrate a delete routine for deleting a connection from the cascading list of the present invention.
Figure 12:
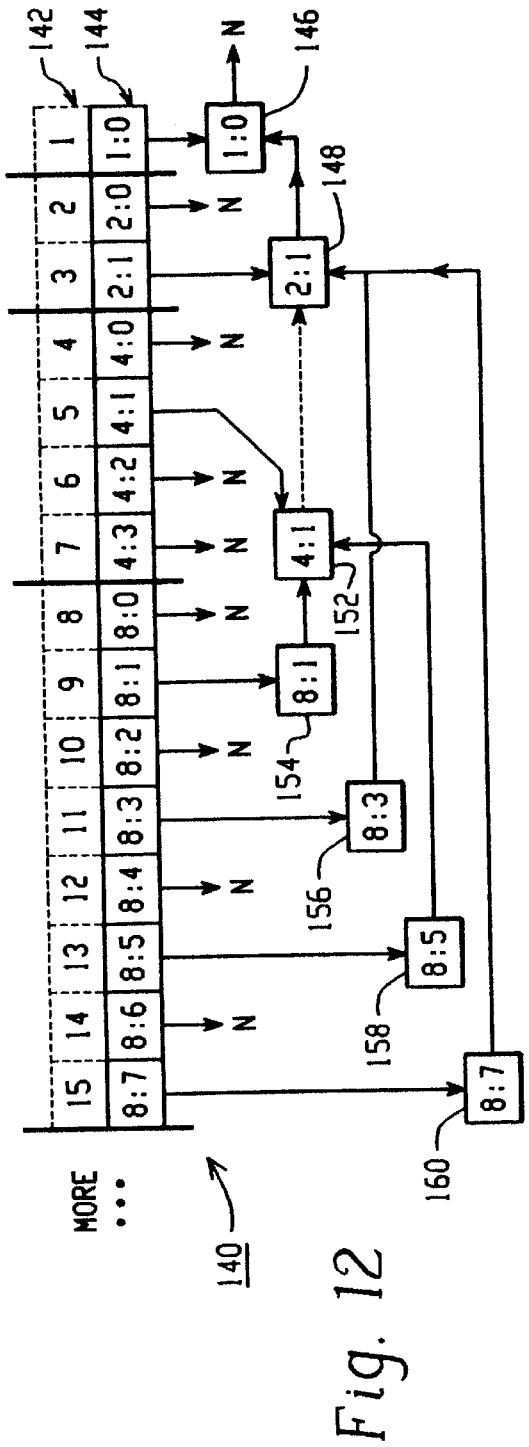

A delete connection routine will now be described with reference to FIGS. 11 and 12, which show a schedule head array 140 and corresponding cascading list. Schedule head array 140 includes a plurality array data cells 144 referenced by index numbers 142. The cascading list includes connections 146 through 160. FIG. 11 illustrates the cascading list before connection 150 is deleted, while FIG. 12 illustrates the cascading list after connection 150 has been deleted.

The delete connection routine finds the location in the cascading list of the connection to be deleted, and then deletes the desired connection from the cascading list. Like the add connection routine described above, the delete connection routine must determine the index number referencing the schedule head pointer that points to the correct rate-list. Once the index number is determined, the position (e.g., first instance, second instance, etc.) of the connection in the rate-list must be determined.

If the connection to be deleted is not at the beginning of the rate-list (i.e., not the first instance), the schedule head schedule head array having a plurality of array data cells 174 referenced by index numbers 172. The cascading list consists of connections 180 through 184.

The cascading list is arranged so that the time spent traversing the cascading list during data collection is minimized. Accordingly, this simplifies the data collection routine. The starting point in the cascading list for each PIT is determined by accessing the schedule head pointers. As discussed above, the schedule head pointer pointing to the first connection for a PIT is always taken from the section of the schedule head array corresponding to a PRP equal to the PITs per macrocycle. The appropriate schedule head pointer for the current PIT will correspond to a first PIT number equal to the current PIT. Once the beginning of the cascading list for the current PIT is determined from the schedule head pointer, the cascading list is simply traversed until a NULL pointer is found. All the data items associated with the traversed connections is collected for transfer.

Figure 13:
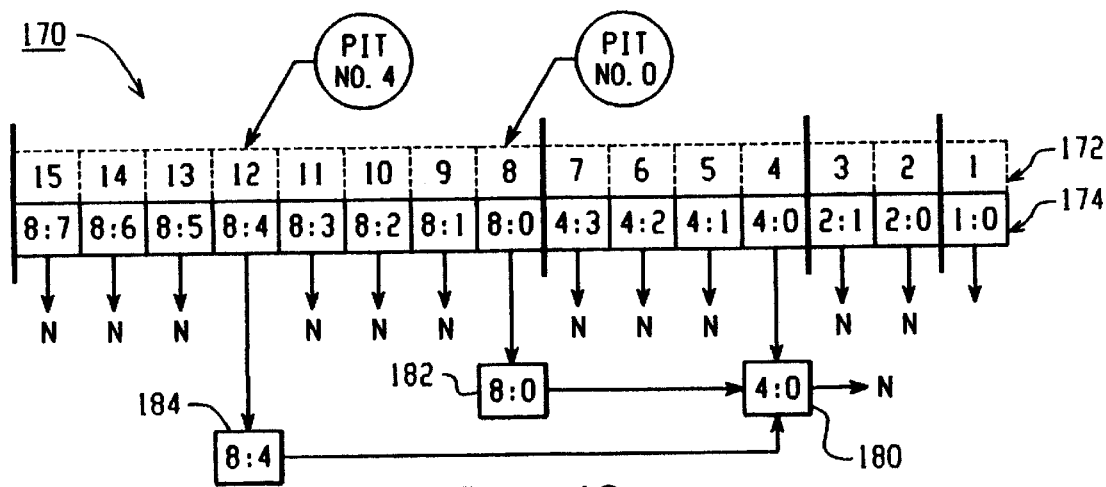
FIG. 13 illustrates a data collection routine for traversing the cascading list of the present invention.

In the example shown in FIG. 13, the PITs per macrocycle is set to 8. Accordingly, for PIT NO. 0, the data collection routine accesses the schedule head pointer corresponding to a PRP of 8 and a first PIT of 0. As a result, for PIT NO. 0, the cascading list is traversed starting at connection 182 and continues to connection 180. Connection 180 has a NULL pointer indicating the last connection for the current PIT.

For PIT NO. 1, the data collection routine accesses the schedule head pointer corresponding to a PRP of 8 and a first PIT of 1. In this case, the schedule head pointer is a NULL pointer. Accordingly, there are no connections for PIT NO. 1. Likewise, PIT NOS. 2 and 3 also have no connections. For PIT NO. 4, the appropriate schedule bead pointer points to connection 184. Accordingly, data collection for PIT NO. 4 will begin with connection 184 and continue to connection 180. It should be appreciated that connection 180 is repeated from PIT NO. 0.

Figure 14:
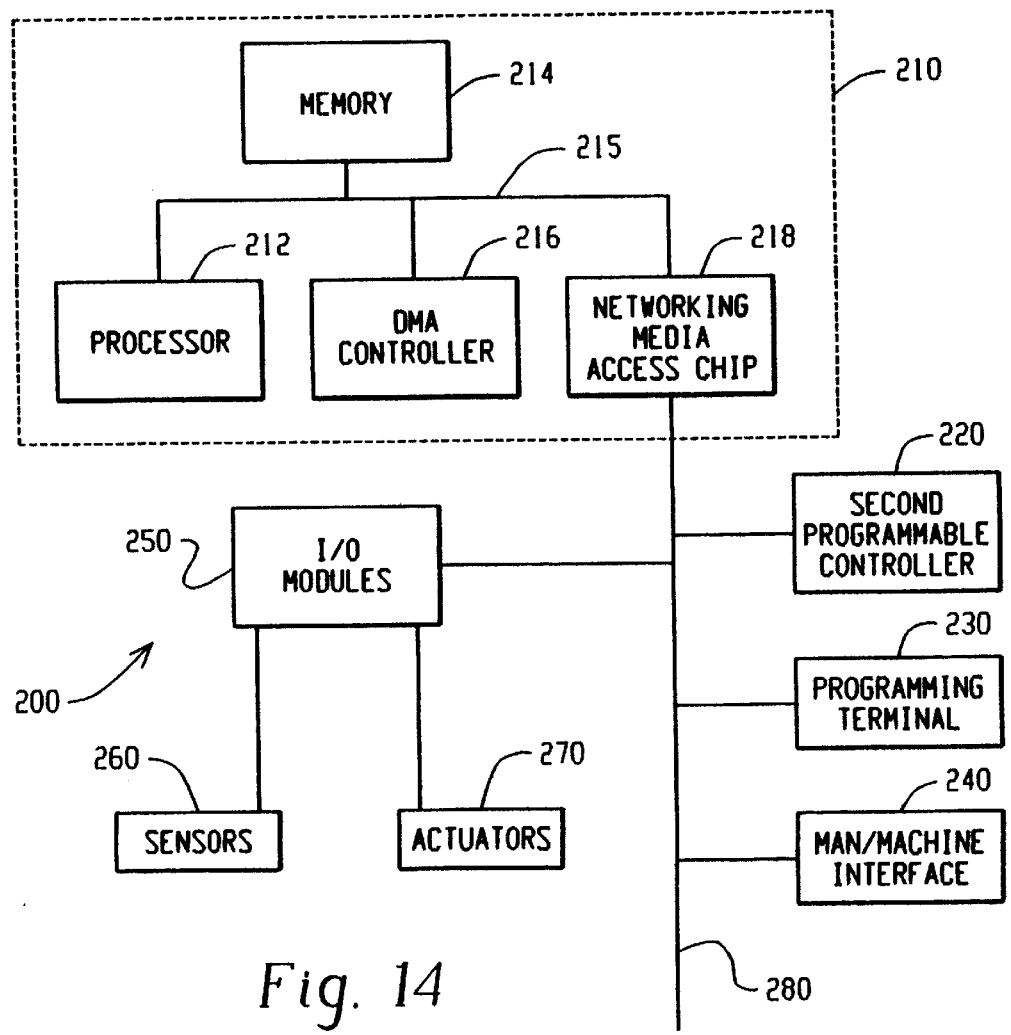
FIG. 14 shows a block diagram of an exemplary network system.

Referring now to FIG. 14, there is shown an example of a network system 200, used for industrial automation. Basically, network system 200 comprised of a first programmable controller 210, a second programmable controller 220, a programming terminal 230, a man-machine interface (MMI) 240, I/O module 250, sensors 260, actuators 270 and a communications medium 280.

Programmable controller 210 (e.g., a PLC®-5 available from Allen-Bradley Company, Inc.), includes a processor 212 (e.g., a 68340 microprocessor available from Motorola Inc.), a memory 214, a DMA controller 216 and a networking access media chip 218. These components are connected via a bus 215. It should be appreciated that programmable controller 210 will include other components which are not shown.

Memory 214 provides the storage for the schedule head array and cascading list, including pointers and data items. Memory 214 may also provide storage for the program code for processing, modifying and maintaining the cascading list and scheduling array.

DMA controller 216 controls access to memory 214 during a DMA cycle, as is well known in the art. Networking media access chip 218 provides an interface to communications medium 280, which will be described below.

Second programmable controller 220 is similar in arrangement to programmable controller 210. Programming terminal 230 provides means for configuring, modifying, debugging and maintaining network system 200. Man-machine interface 240 provides an operator interface for operating network system 200 to perform an automated industrial process.

I/O module 250 (e.g., 1771 adapter modules or FLEX I/O adapter modules available from Allen-Bradley Company, Inc.) provides an interface to sensors 260 and actuators 270. I/O module 250 will also include a processor and memory for carrying out the scheduling method of the present invention. Moreover, the scheduling method may also be performed by other "nodes" on the network to transfer data. Sensors 260 may sense items such as temperature, pressure, flow rate of a fluid, torque, electrical current, etc. Actuators 270 control items such as switches and valves associated with fans, beaters, pumps, etc.

Communication medium 280 will typically take the form of a cable, and may also include repeaters, routers, bridges, and gateways. In a preferred embodiment of the present invention, communication medium 280 is the ControlNet™ network from Allen-Bradley Company, Inc. ControlNet™ is a high-speed, deterministic, scheduled network for the transmission of time-critical application information.

An example of the operation of network system 200, as it relates to the scheduling system described above, will now be described with reference to FIG. 14. Data items are initially obtained by sensors 270. These data items are continuously transferred to a memory in I/O module 250, overwriting old data items with new data items. I/O module 250 will use the scheduling system of the present invention to collect data items in its memory for transfer to memory 214 of programmable controller 210. This data transfer will occur during PITs. Processor 212 analyzes the received data items and prepares outgoing data items. In this respect, processor 212 will use the scheduling system of the present invention to collect data items in memory 214 for transfer to the memory of I/O module 250. This transfer will occur during PITs. I/O module 250 will, in turn, transfer the received data items to actuators 270. In addition, data transfer may also occur in a similar manner between first programmable controller 210 and second programmable controller 220, as well as among other nodes.

The foregoing description is a specific embodiment of the present invention. It should be appreciated that this embodiment is described for purposes of illustration only, and that numerous alterations and modifications may be practiced by those skilled in the art without departing from the spirit and scope of the invention. In particular, it should be understood that while the present invention has been described with particular reference to scheduling data collection for transfer of data, the invention Is applicable to the scheduling of other periodic events having varying rates. It is intended that all such modifications and alterations be included insofar as they come within the scope of the invention as claimed or the equivalents thereof.

The invention claimed is:

1. A method for scheduling the transfer of data during a plurality of data transfer intervals on a computer network linking devices associated with an automated industrial process, said method comprising:

generating a cascading list comprised of a plurality of overlapping linked lists formed from a plurality of data cells associated with a plurality of data items, each of said data items being transferred during at least one of said data transfer intervals, the cascading list having a set of data items being common to a set of linked lists whereat the plurality of linked lists overlap;

traversing said cascading list for a respective data transfer intervals to collect said data items requiring transfer during said respective data transfer interval.

2. A method according to claim 1, wherein said cascading list is comprised of a plurality of overlapping linked lists, each said linked list having one or more linked data cells associated with data items requiring transfer during the same data transfer interval.

3. A method for scheduling the transfer of data during a plurality of data transfer intervals on a computer network linking devices associated with an automated industrial process, said method comprising:

generating a cascading list comprised of plurality of overlapping linked lists formed from a plurality of data cells associated with a respective plurality of data items, each of said data items being transferred during at least one of said data transfer intervals, each said overlapping linked list having one or more linked data cells associated with data items requiring transfer during the same data transfer interval; and, traversing said cascading list for a respective data transfer interval to collect data items requiring transfer during said respective data transfer interval, wherein each of said linked lists consists of a set of linked data cells arranged in descending order, from data cells associated with data items having a low periodic-interval-time-repeat-period value indicating a low data transfer rate to data cells associated with data items having a high periodic-interval-time-repeat-period value indicating a high data transfer rate.

4. A method according to claim 1, wherein said linked data cells include a first field having a first pointer to a data item and a second field having a second pointer to a linked data cell in the cascading list or a NULL pointer.

5. A method according to claim 4, wherein said method further comprises the step of establishing an array to provide a plurality of entry pointers, each said entry pointer respectively pointing to a linked data cell in said cascading list associated with a first data item to be transferred during a respective data transfer interval.

6. A method for scheduling the transfer of data during a plurality of data transfer intervals on a computer network linking devices associated with an automated industrial process, said method comprising:

generating a cascading list comprised of plurality of linked data cells associated with a respective plurality of data items, each of said data items being transferred during at least one of said data transfer intervals, each of said linked data cells including a first field having a first pointer to a data item and a second field having a second pointer to a linked data cell in the cascading list or a NULL pointer;

traversing said cascading list for a respective data transfer interval to collect data items requiring transfer during said respective data transfer interval by retrieving one to said plurality of entry pointers from said array to determine a starting position in said cascading list for a respective data transfer interval; and, establishing an array to provide a plurality of entry pointers, each said entry pointer respectively pointing to a linked data cell in said cascading list associated with a first data item to be transferred during a respective data transfer interval.

7. A method for scheduling the transfer of data during a plurality of data transfer intervals on a computer network linking devices associated with an automated industrial process, said method comprising:

generating a cascading list comprised of plurality of linked data cells associated with a respective plurality of data items, each of said data items being transferred during at least one of said data transfer intervals, each of said linked data cells including a first field having a first pointer to a data item and a second field having a second pointer to a linked data cell in the cascading list or a NULL pointer;

traversing said cascading list for a respective data transfer interval to collect data items requiring transfer during said respective data transfer interval; and, establishing an array to provide a plurality of entry pointers, each said entry pointer respectively pointing to a linked data cell in said cascading list associated with a first data item to be transferred during a respective data transfer interval, said array having a plurality of array data cells referenced by respective indices, wherein said indices are index numbers equal to the sum of a data transfer rate value and a value indicating a first data transfer interval for transfer of a data item, said plurality of array data cells having a pointer to a linked data cell in the cascading list or a NULL pointer.

8. A method according to claim 7, wherein said method further comprises the step of adding a new linked data cell to said cascading list, wherein said step of adding said new linked data cell includes the step of referencing said array to locate a position in said cascading list for said new linked data cell and resetting the second pointers of one or more existing linked data cells in said cascading list to point to said new linked data cell and setting the second pointer of the new linked data cell to point to a subsequent linked data cell in said cascading list or a NULL.

9. A method according to claim 7, wherein said method further comprises the step of deleting a linked data cell from said cascading list, wherein said step of deleting said linked data cell includes the step of referencing said array to locate said linked data cell to be deleted in said cascading list and resetting said second pointer of one or more linked data cells in said cascading list which previously pointed to said deleted linked data cell to point to the linked data cell in said cascading list said deleted linked data cell previously pointed to.

10. A method for scheduling the transfer of data during a plurality of data transfer intervals on a computer network linking devices for an automated industrial process, said method comprising:

generating a cascading list comprised of a plurality or overlapping linked lists, each overlapping linked list having at least one data cell, each of said data cells including a first pointer to a data item and a second pointer to another data cell or a NULL pointer indicating the end of the linked list, wherein each of said plurality of overlapping linked lists have data cells pointing to data items requiring transfer during the same data transfer interval and wherein at least two of said second pointers point to a single data item whereat said plurality of linked lists overlap; and traversing one of said plurality of linked lists for each data transfer interval to collect the data items requiring transfer.

11. A method for scheduling periodic events occurring at various time intervals, said method comprising:

generating a plurality of overlapping linked lists having a plurality of linked data cells, each of said plurality of linked data cells being associated with an event, each of said plurality of overlapping linked lists being associated with events occurring during the same time interval, wherein multiple linked data cells are common to multiple linked lists whereat the multiple linked lists overlap;

traversing one of said plurality of overlapping linked lists for each time interval to execute the event.

12. A method according to claim 11, wherein said plurality of linked lists are overlapped to form a single cascading list.

13. A method according to claim 12, wherein said event is data collection of a data item.

14. A method according to claim 12, wherein said event is sampling of a data item.

15. A system for scheduling the transfer of data during a plurality of data transfer intervals on a computer network linking devices associated with an automated industrial process, said system comprising:

means for generating a cascading list comprised of a plurality of overlapping linked lists formed from a plurality of linked data cells, each of the plurality of linked data cells being associated with a corresponding plurality of data items, each of said plurality of data items being transferred during at least one of said data transfer intervals, the cascading list generated having a plurality of data items common to at least two linked lists whereat the at least two linked lists overlap; and means for traversing said cascading list for a respective data transfer interval to collect said data items requiring transfer during said respective data transfer interval.

16. A system according to claim 15, wherein said system further comprises means of establishing an array to provide a plurality of entry pointers, each said entry pointer respectively pointing to a linked data cell in said cascading list associated with a first data item to be transferred during a respective data transfer interval.

17. A system according to claim 16, wherein said means of traversing said cascading list includes the step of retrieving one of said plurality of entry pointers from said array to determine a starting position in said cascading list for a respective data transfer interval.

18. A system according to claim 16, wherein said array has a plurality of array data cells referenced by respective indices, wherein said indices are index numbers equal to the sum of a data transfer rate value and a value indicating a first data transfer interval for transfer of a data item, said plurality of array data cells having a pointer to a linked data cell in the cascading list or a NULL pointer.

19. A system for scheduling the transfer of data during a plurality of data transfer intervals on a computer network linking devices for an automated industrial process, said system comprising:

means for generating a cascading list comprised of a plurality of overlapping linked lists, each overlapping linked list having at least one data cell, each of said data cells including a first pointer to a data item and a second pointer to another data cell or a NULL pointer indicating the end of the linked list, wherein each of said plurality overlapping linked lists have data cells pointing to data items requiring transfer during the same data transfer interval, and wherein at least two of said second pointers point to a single data item whereat the cascading list overlaps; and means for traversing one of said plurality of linked lists for each data transfer interval to collect the data items requiring transfer.

20. A method for scheduling the transfer of data during a plurality of data transfer intervals on a computer network linking devices associated with an automated industrial process, the method comprising the steps of:

generating a cascading list comprised of a plurality of linked lists formed from a plurality of linked data cells associated respectively with a plurality of data items, each of said plurality of data items being transferred during at least one of said data transfer intervals, each of said plurality of linked lists including a set of linked data cells arranged in descending order from data cells associated with data items having a low data transfer rate to data cells associated with data items having a high data transfer rate;

for a first data transfer interval, traversing said cascading list to collect first data items requiring transfer during said first data transfer interval; and, establishing an array to provide a plurality of entry pointers, each of said plurality of entry pointers respectively pointing to a linked data cell in said cascading list associated with a first data item to be transferred during a respective data transfer interval, said array having a plurality of array data cells referenced by respective indices, wherein said indices are index numbers equal to the sum of a data transfer rate value and a value indicating a first data transfer interval for transfer of a data item, said plurality of array data cells having a pointer to a linked data cell in the cascading list or a NULL pointer.

21. The method for scheduling the transfer of data during a plurality of data transfer intervals according to claim 20 further comprising the step of adding a new linked data cell to said cascading list by referencing said array to locate a position in said cascading list for said new linked data cell and resetting the second pointers of one or more existing linked data cells in said cascading list to point to said new linked data cell and setting the second pointer of the new linked data cell to point to a subsequent linked data cell In said cascading list or a NULL.

22. A method for scheduling the transfer of data during a plurality of data transfer intervals according to claim 20 further comprising the step of deleting a linked data cell from said cascading list by referencing said array to locate said linked data cell to be deleted in said cascading list and resetting said second pointer of one or more linked data cells in said cascading list which previously pointed to said deleted linked data cell to point to the linked data cell in said cascading list said deleted linked data cell previously pointed to.

23. A method for scheduling the transfer of data during a plurality of data transfer intervals on a computer network linking devices associated with an automated industrial process, the method comprising the steps of:

generating a cascading list comprised of a plurality of linked lists formed from a plurality of linked data cells associated respectively with a plurality of data items, each of said plurality of data items being transferred during at least one of said date transfer intervals, each of said plurality of linked lists including a set of linked data cells arranged in descending order from data cells associated with data items having a low data transfer rate to data cells associated with data items having a high data transfer rate;

for a first data transfer interval, traversing said cascading list to collect first data items requiring transfer during said first data transfer interval; and, establishing an array to provide a plurality of entry pointers, each of said plurality of entry pointers respectively pointing to a linked data cell in said cascading list associated with a first data item to be transferred during a respective data transfer interval, said array including a plurality of array data cells having a pointer to a linked data cell in the cascading list or A NULL pointer.

24. The method for scheduling the transfer of data during a plurality of data transfer intervals according to claim 23 further comprising the step of adding a new linked data cell to said cascading list by referencing said array to locate a position in said cascading list for said new linked data cell and resetting the second pointers of one or more existing linked data cells in said cascading list to point to said new linked data cell and setting the second pointer of the new linked data cell to point to a subsequent linked data cell in said cascading list or a NULL.

25. A method for scheduling the transfer of data during a plurality of data transfer intervals according to claim 23 further comprising the step of deleting a linked data cell from said cascading list by referencing said array to locate said linked data cell to be deleted in said cascading list and resetting said second pointer of one or more linked data cells in said cascading list which previously pointed to said deleted linked data cell to point to the linked data cell in said cascading list said deleted linked data cell previously pointed to.

* * * * *